United States Patent Office 3,846,088
Patented Nov. 5, 1974

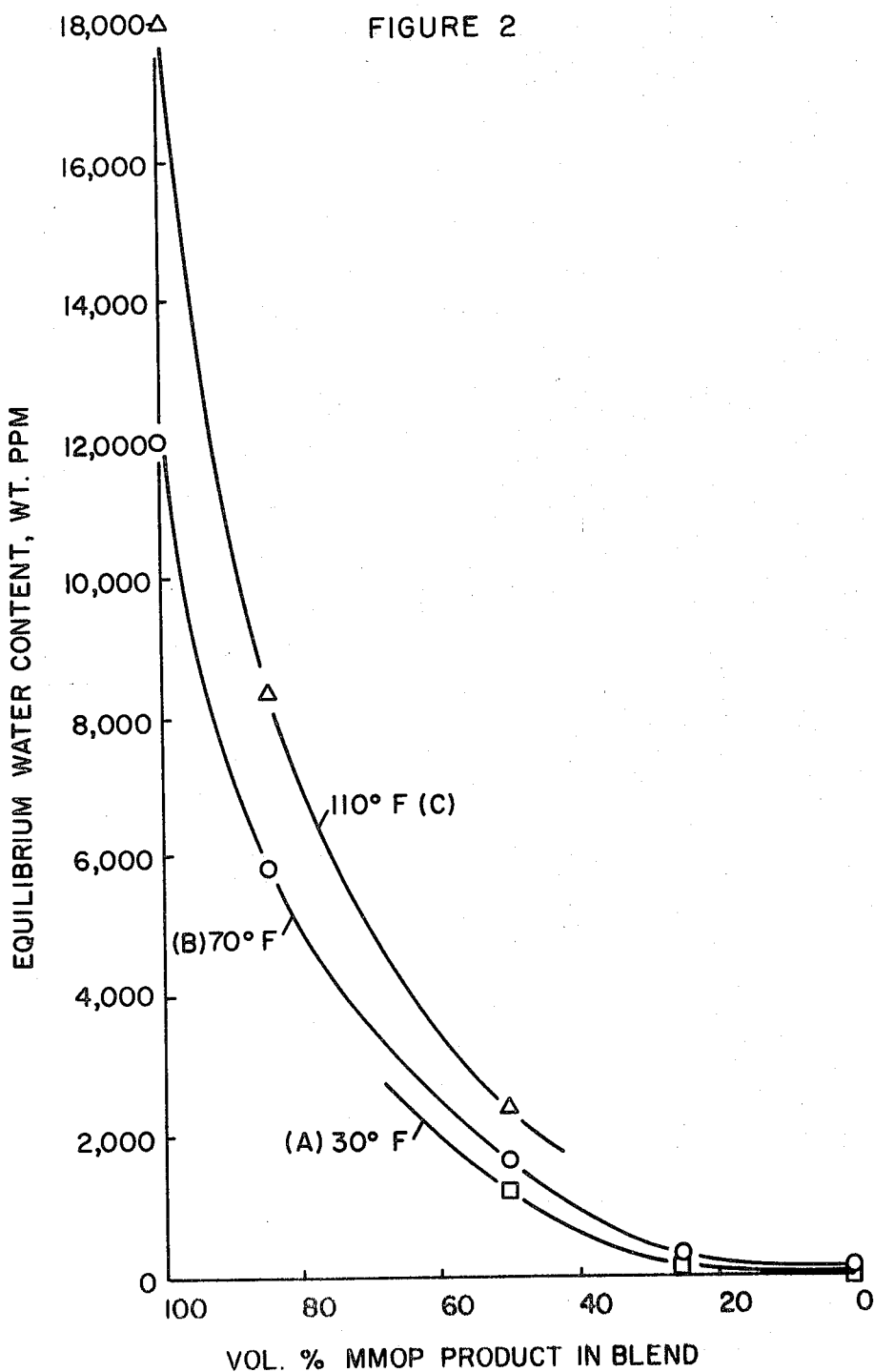

3,846,088
PROCESS OF DRYING ETHERS
Ronald W. Brown and Ronald W. Reynolds, Wilmington, Del., assignors to Sun Oil Company of Pennsylvania, Philadelphia, Pa.
Filed Dec. 22, 1971, Ser. No. 210,910
Int. Cl. C10l 1/02
U.S. Cl. 44—56    8 Claims

ABSTRACT OF THE DISCLOSURE

Process of producing high octane gasoline components from refinery streams such as mixed streams of butanes and butenes. The mixed stream is first etherified with methanol which selectively removes isobutene from the mixed stream. The remainder of the mixed stream is alkylated. The etherification product is water washed to remove methanol and is then mixed with a paraffin containing 5 to 10 carbon atoms to form a blend containing 20 to 80% ether. The blend is then allowed to settle or is fed to a coalescer to remove the water which had been dissolved by the ether but is caused to be rejected by the paraffin. The settling or coalescing is carried out at below 130° F. and generally at from 60 to 120° F.

BACKGROUND OF THE INVENTION

In the past, refiners have used available streams of the 3 to 6 carbon atom olefins and alkylated these with isobutane to produce isooctane and other high octane gasoline components by means of the known alkylation reactions. Similarly, it has also been known that branched chain ethers having high octane numbers can be produced by reacting olefins with alcohols. Recently, the necessity of producing high octane unleaded gasoline has made these ethers economically attractive. When producing such ethers, it is desirable to remove the unreacted alcohol from the ether and recycle it to the etherification reactor; it is this separation to which the present invention is directed.

SUMMARY OF THE INVENTION

The present invention involves the combination of preparing various ethers such as 2-methyl-2-methoxypropane from a $C_1$–$C_3$ alcohol such as methanol and a mixed stream of hydrocarbons containing a $C_4$–$C_6$ tertiary olefin such as a stream containing n-butane, isobutane, n-butenes and isobutene (mixed $C_4$'s) and subsequently reacting the remaining mixed $C_4$'s with isobutane to form isooctane. In accordance with the present invention the tertiary olefins such as isobutene is selectively removed from the hydrocarbon stream by means of the etherification reaction. The reaction effluent is then subjected to a separation to provide a stream containing the ether and a stream consisting essentially of the unreacted hydrocarbons. This latter stream of hydrocarbons is then used as the feed for an alkylation reaction. The ether product stream contains significant amounts of alcohol depending on the ratio of alcohol to tertiary olefin in the etherification reactor. This alcohol is removed by a water wash. The alcohol is separated from the resulting water phase by distillation. The ether phase then contains several thousand p.p.m. of water which is reduced by mixing the ether with a paraffin containing 5 to 10 carbon atoms to form a blend containing from 20 to 90 volume percent ether and preferably 30 to 85 volume percent ether which causes the water to be rejected. The resulting mixture of paraffin and ether is used directly as a gasoline blending component or can be subjected to further drying.

DESCRIPTION OF THE DRAWING

FIG. 2 is a plot of the amount of water present at various proportions and temperatures of 2-methyl-2-methoxypropane and the alkylate of isobutane and a mixture of 1- and 2-butene and isobutene.

In FIG. 1 a stream 1 of hydrocarbons containing 4 to 6 carbon atoms and which stream contains a tertiary olefin is fed to reactor 2. A stream 3 of an alcohol containing 1 to 3 carbon atoms is fed to reactor 2. Reactor 2 selectively reacts the tertiary olefin with the alcohol to produce an ether. The entire reaction product is removed as stream 4 and fed to distillation column 5. The unreacted hydrocarbons are removed from distillation column 5 as stream 6 and fed to alcohol remover 7 where any alcohol contained in the unreacted hydrocarbons is removed. The bottoms product stream 8 from distillation column 5 contains unreacted alcohol, the product ether and a small amount of various hydrocarbons. This stream 8 is water washed in water washer 9 to reduce the alcohol content of the stream. Water is fed to water washer 9 as stream 10. The washed ether is removed from water washer 9 as stream 11. The ether product stream 11 is then further processed by adding a $C_5$–$C_{10}$ paraffin in step 12 to remove water as stream 13 and provide a dried stream 15 of ether and paraffin. The water and methanol are removed from water washer 9 as stream 16 and fed to distillation column 17. Alcohol is removed from distillation column 17 as stream 18 and recycled to etherification unit 2. Water is removed from distillation column 17 as stream 19 and recycled to water washer 9. The alcohol removed from the mixed $C_4$'s in methanol remover 7 is removed as stream 20 and combined with stream 16. The unreacted hydrocarbons are removed from alcohol remover 7 as stream 21 and fed to alkylation unit 22. The olefins present in alkylation unit 22 react with tertiary paraffins such as isobutane and the product of this alkylation is removed as stream 23. The unreacted hydrocarbons are removed from alkylation unit 22 as stream 24 and processed as desired. A stream 25 of sulfuric acid is fed to alkylation unit 22 and spent sulfuric acid is removed as stream 26. In a preferred aspect of the invention a portion of stream 23 is fed as stream 27 to step 12 as part or all of stream 14 to provide the paraffin feed for rejecting water in the ether product.

FIG. 2 is a plot wherein the ordinate is parts per million water by weight present and the abscissa is volume percent of a 2-methyl-2-methoxypropane product containing 87.3 volume percent 2-methyl-2-methoxypropane, 8.1 volume percent isopentane and 4.6 volume percent methanol, present in a blend with the sulfuric acid catalyzed alkylate of isobutane and a blend of approximately equal parts 1-butene, 2-butene and isobutene. Line A is the equilibrium for the blends at 30° F., line B is the equilibrium at 70° F. and line C is the equilibrium at 110° F.

DESCRIPTION OF THE INVENTION

Figure 1:
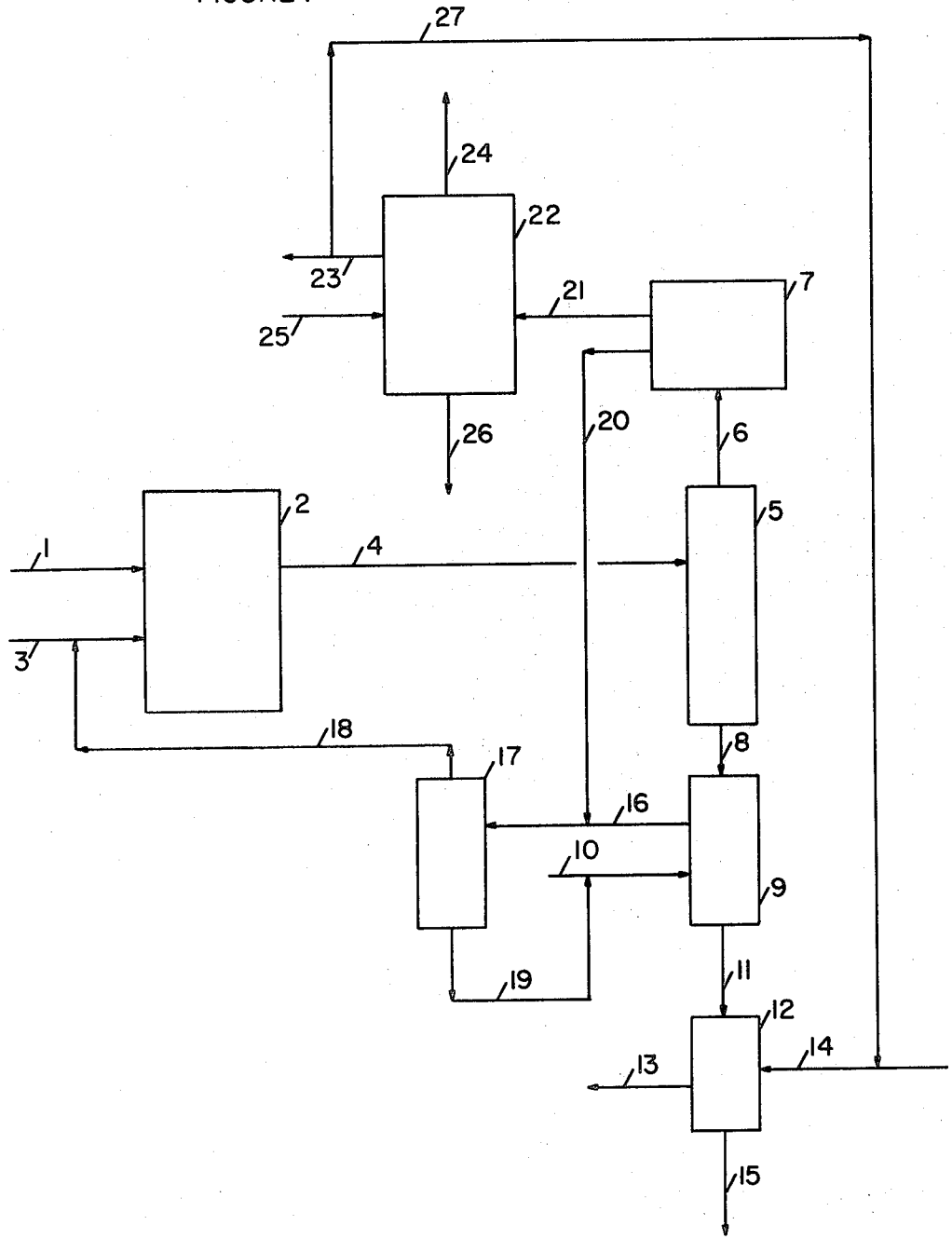
FIG. 1 is an overall flowsheet of the process of the present invention.

The starting material hydrocarbon stream may be obtained as a plant stream from either a catalytic cracking unit or a thermal cracking unit or both. This stream should contain at least 5 weight percent of a tertiary olefin containing from 4 to 6 carbon atoms. Above 6 carbon atoms the octane rating of the product ether drops off and their use becomes unattractive. Isobutane is the preferred tertiary olefin and is most conveniently obtained from a stream of mixed $C_4$'s. Generally this stream of mixed $C_4$'s will contain 10 to 25 weight percent n-butane, from 30 to 45 weight percent isobutane, from 15 to 50 weight percent n-butene and from 5 to 20 weight percent isobutene.

The etherification catalyst used herein are relatively high molecular weight carbonaceous materials containing at least one —$SO_3H$ group as the functional group. These catalysts are exemplified by the sulfonated coals ("Zeo-Karb H", "Nalcite X" and "Nalcite AX") produced by the treatment of bituminous coals with sulfuric acid and commercially marketed as zeolitic water softeners or base exchangers. These materials are usually available in a neutralized form and in this case must be activated to the hydrogen form by treatment with a strong mineral acid such as hydrochloric acid and water washed to remove sodium and chloride ions prior to use. The sulfonated resin type catalysts are preferred for use in the present invention. These catalysts include the reaction products of phenol-formaldehyde resins with sulfuric acid ("Amberlite IR-1," "Amberlite IR-100" and "Nalcite MX"). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The most preferred cationic exchange resins are strongly acidic exchange resins consisting essentially of sulfonated polystyrene resin, for instance, a divinylbenzene cross-linked polystyrene matrix having from 0.5 to 20 percent and preferably from 4 to 16 percent of copolymerized divinylbenzene therein to which are ionizable or functional nuclear sulfonic acid groups. These resins are manufactured and sold commercially under various trade names such as "Dowex 50," "Nalcite HCR" and "Amberlyst 15." As commercially obtained they have solvent contents of about 50% and can be used as is or the solvent can be removed first. The resin particle size is not particularly critical and therefore is chosen in accordance with the manipulative advantages associated with any particular size. Generally mesh sizes of 10 to 50 United States Sieve Series are preferred. The reaction may be carried out in either a stirred slurry reactor or in a fixed bed continuous flow reactor. The catalyst concentration in a stirred slurry reactor should be sufficient to provide the desired catalytic effect. Generally catalyst concentration should be 0.5 to 50% (dry basis) by weight of the reactor contents with from 1 to 25% being the preferred range.

In a continuous reactor, which is preferred, the catalyst concentration may be defined by volumetric hourly space velocity; that is, the volume of feed processed per volume of catalyst per hour. The volumetric hourly space rate can be about 0.1 to 100 based on isobutene and generally is from 0.5 to 25 and preferably is from 0.5 to 10.

The ether is formed by reacting the tertiary olefin with an alcohol. Generally any alcohol can be used but the alcohols containing from 1 to 3 carbon atoms are preferred because they produce ethers with the highest octane at the lowest cost. Particularly preferred alcohols are isopropyl alcohol and methyl alcohol. A mole ratio of alcohol to tertiary olefin of from 0.1 to 10 is generally used with from 0.5 to 5 being preferred. Generally the etherification is carried out at from 60 to 300° F. and preferably at 120 to 200° F. Below these temperatures the reaction becomes slow while above these temperatures by-products begin to appear. Pressure is selected to ensure that the charges and products remain as liquids during the reaction. Typical pressures are 30 to 300 p.s.i.g.

The etherification reaction selectively removes the tertiary olefins present from the stream of mixed hydrocarbons. In the case of mixed $C_4$'s this is a distinct advantage when the $C_4$'s are being used in sulfuric acid alkylation because the alkylation product is isobutene and isobutene provides an alkylate having a Research Octane of only 92.7 whereas the alkylation product of isobutane and 1-butene and 2-butene have Research Octanes of 96.8 and 96.2 respectively.[1] The inclusion of the isobutene apparently leads to the formation of an increased amount of dimethylhexanes rather than the preferred trimethylpentanes. Since the isobutene is being converted into 2-methyl-2-methoxypropane which has a Research Octane Number of above 110 it is readily apparent that a substantial improvement in the octane number of the material produced from the original stream of $C_4$'s is obtained over the conventional alkylation of the entire stream of $C_4$'s.

The effluent from the etherification reactor is distilled to separate the unreacted hydrocarbons from the ether and alcohol. Such distillation typically leaves about 0.4 volume percent alcohol in with the $C_4$'s which are to be alkylated. It is desirable to reduce the amount of methanol still further to below say 10 p.p.m. to reduce its dilution effect on the sulfuric acid used in the alkylation step. This is advantageously done by means of a water wash. An alternative is to use molecular sieves. The unreacted hydrocarbons now containing only about 8 to 50% and preferably 8 to 25% of the orginal tertiary olefin are sent to the alkylation unit.

The alkylation step is carried out by charging the stream containing such hydrocarbons as n-butane, isobutane, n-butene and unreacted isobutene to a reactor with total hydrocarbon contact time ranging from 20 to 30 minutes. Additional isobutane is also fed to the reactor. The reactor contains sulfuric acid generally in a concentration of from 88 to 95%. The sulfuric acid is continuously withdrawn from the reactor and new sulfuric acid of 98 to 99.5% concentration is charged to the reactor to maintain the desired acid strength. The alkylation product is continuously removed from the reactor by separating the hydrocarbon and acid layers in a settling zone and sending the hydrocarbon layer to a distillation column where hydrocarbons, not alkylated, are removed overhead. The reactor is maintained at from 0 to 80° F. and preferably from 20 to 60° F. The contents of the reactor are agitated to maintain the reactants in contact with the sulfuric acid.

The product ether and most of the unreacted alcohol are removed from the bottom of the reactor effluent distillation column and then further separated. Preferably this is achieved by countercurrent washing with water using a temperature of 130–150° F., a pressure of 100–150 p.s.i.g. and a solvent ratio of from 0.2 to 2.0 volume water per volume of ether. After contacting, the ether and water phases are allowed to separate in a settling zone. The alcohol is separated from the water layer by distillation and recycled to the original methanol feed. The ether phase generally contains about 0.5 to 2.0 weight percent water as based on the amount of ether present. This is an unacceptably high level when the ether is used as a gasoline blending component. The ether is then mixed with a paraffin containing 5 to 10 carbon atoms to form a blend. Generally this blend will be from 20 to 95% by volume ether and preferably from 30 to 85% by volume ether as based on the total blend. If the blend is to be further dried with a desiccant it is preferred to form a blend of 40 to 85% by volume ether due to the increased amount of material it is necessary to handle at the lower ether levels. On the other hand, if it is desired to use the blend directly as a gasoline blendng component without further drying it normally would pay to form a blend containing from 20 to 50% by volume ether. The amount of water present for the preferred ether, i.e. 2-methyl-2-methoxypropane, is shown in FIG. 2. For instance, using the 40% blend and 70° F. there is 1030 p.p.m. water in the blend. Since the maximum amount of the ether which wouuld be used in an automotive fuel is about 10 volume percent the ether blend would contribute about 258 p.p.m. water to the overall gasoline. This is generally regarded as an acceptable level. It is particularly so here because there is normally from 1 to 10 volume percent the unreacted alcohol remaining with the ether product. This alcohol is associated with the water and prevents it from freezing under any moderately severe winter conditions normally encountered.

---

[1] Reported when using 99% feed acid, 10° C., 30 r.p.m., a residence time of 5 minutes and an isobutane to olefin ratio of 15 : 1, by K. W. Li, R. E. Echert and L. F. Albright, "Industrial and Engineerig Chemistry," Process Des. Develop., vol. 9, No. 3, 1970.

DESCRIPTION OF THE PREFERRED EMBODIMENT

A refinery stream containing 19.0% n-butane, 13.0% trans-butene-2, 37.0% isobutane, 9.0% n-butene-1, 11.0% isobutene, 8.0% cis-butene-2, 3.0% $C_5$'s and a trace of butadiene is charged to an etherification reactor (all percentages by weight) maintained at 180° F. and a pressure of 200 p.s.i., along with 1.5 moles of methanol per mole of isobutene at a rate of 25 lbs. total feed per lb. catalyst per hour. The catalyst is "Amberlyst 15," a 16 to 40 mesh sulfonated cross-linked polystyrene resin with a 4.9 meq./g. available hydrogen ion.

Eighty-five percent of the isobutene is converted to 2-methyl-2-methoxypropane, by reaction with the methanol. The other hydrocarbons do not react. The reactor effluent is sent to a distillation column where the unreacted $C_4$ hydrocarbons are taken overhead. This overhead contains about 0.4 volume percent methanol which is removed by a water wash step. The 2-methyl-2-methoxypropane, most of the $C_5$'s and unreacted methanol are removed from the bottom of the distillation column. This mixture is washed with water in a countercurrent stage process at 140° F., 125 p.s.i.g. and a solvent ratio of 0.5 volume water per volume of 2-methyl-2-methoxypropane to form a methanol-water phase and a 2-methyl-2-methoxypropane phase. The methanol is distilled from the water and recycled to the methanol make-up feed; the water is returned to the washing step.

The 2-methyl-2-methoxypropane phase contains 87.3 volume percent 2-methyl-2-methoxypropane, 8.1 volume percent $C_5$'s from the original feed stream and 4.6 volume percent methanol. This steam is then blended with the alkylate from the alkylation step described below to form a blend containing 50 volume percent alkylate and 50 volume percent of the 2-methyl-2-methoxypropane product. The blend is cooled to 100° F. and fed to a coalescer at a rate to give a superficial velocity of 0.5 ft./min. The coalescer is a column with an intermediate feed point packed with fiberglass. Water is continuously withdrawn from the bottom of the coalescer and the blend of alkylate, 2-methyl-2-methoxypropane, $C_5$'s and methanol from the top of the coalescer. Ths blend contains 2150 p.p.m. water and can be used as a gasoline blending component. However to further reduce the moisture the blend is fed through a column containing 3A molecular sieves at a rate of 4-5 WHSV at a temperature of 110° F. to further reduce the water content of the blend to below 100 p.p.m.

The remaining unreacted hydrocarbons from the etherification unit are fed to an alkylation unit containing 93% sulfuric acid maintained at 40° F. and 14 p.s.i.g. The acid strength is maintained by continuously withdrawing acid and adding fresh 98% sulfuric acid.

The alkylation product is continuously removed from the reactor by separating the hydrocarbon and acid layers in a separating zone. The hydrocarbon is sent to distillation where excess $C_4$'s are removed as overhead. Alkylate product is removed as a bottom product. Isobutane is separated from the other unreacted $C_4$'s and recycled to the reactor. Acid layer from the separating zone is also recycled to the reactor.

The invention claimed is:

1. A process comprising reacting a tertiary olefin containing from 4 to 6 carbon atoms with an alcohol containing from 1 to 3 carbon atoms to form an ether having the structure R—O—R' wherein R is a tertiary alkyl group containing from 4 to 6 carbon atoms and R' is an alkyl group containing 1 to 3 carbon atoms, washing the product mix containing said ether with water to remove unreacted alcohol whereby an ether product containing from 0.5 to 2.0 volume percent water is produced, blending said ether product with a composition consisting essentially of one or more paraffins containing from 5 to 10 carbon atoms to form a blend consisting principally of the ether and the paraffin which blend contains from 20 to 90 volume percent ether, maintaining said blend at from 30 to 150° F., permitting said blend to form two separate phases one of which consists essentially of water and the other which consists essentially of ether and paraffin from the water and recovering a blend of said ether and said paraffin containing a reduced amount of water which blend is then further blended with gasoline to form a gasoline containing up to about 10 volume percent of the ether.

2. The process of Claim 1 wherein the phase separation is carried out in a coalescer.

3. The process of Claim 2 wherein the tertiary olefin reacted with the alcohol is part of a mixed hydrocarbon stream boiling principally in the 3 to 6 carbon atom range which stream contains at least 5 weight percent of the tertiary olefin and the unreacted hydrocarbons are sent to an alkylation unit.

4. The process of Claim 3 wherein the alkylation product is the paraffin blended with the ether.

5. The process of Claim 4 wherein the alcohol starting material is methanol.

6. The process of Claim 5 wherein the mixed hydrocarbon feed stream consists essentially of four carbon atom hydrocarbons and the tertiary olefin is isobutent.

7. The process of Claim 6 wherein the blend of ether and paraffin contains from 20 to 50 volume percent ether and the ether and paraffin are blended into a gasoline without further drying.

8. The process of Claim 6 wherein the blend of ether and paraffin contains from 40 to 85 volume percent ether and the blend is further dried.

References Cited
UNITED STATES PATENTS

| | | | |
|---|---|---|---|
| 2,046,243 | 6/1936 | Buc | 44—56 |
| 2,874,033 | 2/1959 | Serniuk et al. | 44—56 |
| 3,168,385 | 2/1965 | Giammaria et al. | 44—56 |
| 3,224,848 | 12/1965 | Henderson | 44—56 |

PATRICK P. GARVIN, Primary Examiner

Y. H. SMITH, Assistant Examiner

U.S. Cl. X.R.

260—614 A, 616